ADOLPH SPIEGEL, OF HÖCHST-ON-THE-MAIN, GERMANY, ASSIGNOR TO FARB-WERKE, VORMALS MEISTER, LUCIUS & BRÜNING, OF SAME PLACE.

FASTENING AZO COLORS ON YARN OR TEXTILE FABRICS.

SPECIFICATION forming part of Letters Patent No. 302,791, dated July 29, 1884.

Application filed January 10, 1884. (No specimens.)

*To all whom it may concern:*

Be it known that I, ADOLPH SPIEGEL, doctor of philosophy, a citizen of the United States of America, residing at Höchst-on-the-Main, in the Empire of Germany, have invented certain new and useful Improvements in the Manufacture of Coloring-Matter, of which the following is a specification.

My invention relates to the production of fast colors of various shades in or upon a textile fiber, yarn, or cloth, whether knit or woven, by impregnating the same with one or more of the new bisulphite compounds of azo coloring-matters, (forming the subject of another application for a patent to be filed in the United States Patent Office by me,) either in solution or in the form of a paste, be it by themselves or in conjunction with the metallic salts in use as mordants, and then exposing the fiber so impregnated to the action of heat or steam, or to the action of an alkali, or to the action of a hot solution of a nitrite, according to the nature of the fiber.

In carrying out my invention, I take one of the coloring-matters belonging to the well-known series of azo coloring-matters soluble in spirit and not sulphonated—such as are obtained according to the method discovered by Peter Griess, and well understood by chemists—by combining a diazotized organic base of the aromatic series with an aromatic hydroxylated compound—such as phenol or naphthol—or with another base, such as methyl-aniline or diphenylamine. Of any such azo coloring-matter I take a quantity of, say, fourteen pounds and dissolve or suspend the same in a quantity of, say, one hundred and twelve pounds spirits of wine, adding thereunto, say, twenty-eight pounds of a concentrated solution of a bisulphite of an alkali or other base, the bisulphite of which is soluble in spirits of wine, and in a closed vessel, or in one supplied with a reversed cooler, heat the mixture upon the water-bath for, say, three hours, stirring all the time. By this treatment the bisulphite is caused to combine with the azo coloring-matter employed to form a compound of the said azo coloring-matter with the bisulphite in question, which compound proves unstable on exposure to certain agencies.

To separate the bisulphite compound of the azo coloring-matter, the spirit is distilled off and the residue allowed to cool, whereupon it will be found to consist of a paste of crystals. These latter are filtered from the suspending liquid and now represent the above-mentioned azo color.

The color prepared, as just described, is distinguished by the following properties: It is more or less soluble in water, forming yellow solutions with more or less of a red tint. Textile fiber is dyed unstable yellow or reddish shades by steeping it in such a solution. When this color is boiled with water, or when it is treated with an alkaline agent, or when it is heated with the solution of a nitrite, the bisulphite compound is decomposed, and the azo coloring-matter from which it had been prepared, or the salt of the latter, is precipitated.

In order to develop the color in or upon textile fiber, yarn, or cloth, whether knit or woven, I impregnate such fabric with this color or with a mixture of azo S colors, either in solution or in the form of a paste, along with or without aluminum, iron, or chromium salts, in use as mordants according to requirements, and then expose the fiber, yarn, or cloth so impregnated to the action of steam, or of an alkaline agent, or of a hot solution of a nitrite just as is found fit for the particular fabric. By these treatments these colors suffer the decomposition above explained in or upon the textile fabric, and thereby the unstable shade imparted to the fabric by the said color is converted into the stable shades due to the azo coloring matter or matters from which the before-mentioned colors had been prepared, or to the salts, or to the lakes of the aforesaid coloring matter or matters.

I am aware of the British patent of Griess, No. 3,698 of 1877, upon the principle mentioned in this specification, and make claim only to the coloring-matters obtained by combining this compound described by him with bisulphite.

Having thus described my invention, what I claim as new, and desire to secure by Letters Patent, is—

1. The within-described process of developing azo colors in or upon a textile fiber, yarn, or cloth, whether knit or woven, by impregnating such fiber or fabric with the bisulphite compounds of azo coloring-matters formed from diazo compounds herein described, combined with aromatic hydroxylated bodies or phenols, together with salts of alumina, iron, or chromium, and then exposing the fiber so impregnated to the action of heat, preferably of steam, or to the action of an alkaline agent, or of a hot solution of a nitrite, substantially as set forth.

2. Textile fiber, yarn, or cloth dyed with azo or diazo colors impregnated into them and combined with the alkaline bisulphite compounds set forth, combined with hydroxylated compounds of the aromatic hydrocarbons developed upon said fibers or fabrics, in the manner herein described.

In testimony whereof I affix my signature in presence of two witnesses.

ADOLPH SPIEGEL.

Witnesses:
F. VOGELER,
J. GRUND.